(12) United States Patent
Ko

(10) Patent No.: US 10,261,544 B2
(45) Date of Patent: Apr. 16, 2019

(54) ELECTRONIC DEVICE WITH FOLDING FUNCTION BETWEEN PHOTOVOLTAIC CELL PANEL AND DISPLAY PANEL

(71) Applicant: Young Sang Ko, Seoul (KR)

(72) Inventor: Young Sang Ko, Seoul (KR)

( * ) Notice: Subject to any disclaimer, the term of this patent is extended or adjusted under 35 U.S.C. 154(b) by 0 days.

(21) Appl. No.: 15/575,560

(22) PCT Filed: May 19, 2016

(86) PCT No.: PCT/KR2016/005332
§ 371 (c)(1),
(2) Date: Nov. 20, 2017

(87) PCT Pub. No.: WO2016/195295
PCT Pub. Date: Dec. 8, 2016

(65) Prior Publication Data
US 2018/0129249 A1    May 10, 2018

(30) Foreign Application Priority Data

Jun. 2, 2015 (KR) .......................... 10-2015-0077751

(51) Int. Cl.
*H05K 5/00* (2006.01)
*G06F 1/16* (2006.01)
(Continued)

(52) U.S. Cl.
CPC ........... *G06F 1/1635* (2013.01); *G04C 10/02* (2013.01); *G04G 17/045* (2013.01); *G04G 19/00* (2013.01); *G06F 1/163* (2013.01); *G06F 1/1681* (2013.01); *H02S 30/00* (2013.01); *H02S 30/20* (2014.12); *H02S 99/00* (2013.01)

(58) Field of Classification Search
CPC ........................................................ H05K 7/00
See application file for complete search history.

(56) References Cited

U.S. PATENT DOCUMENTS

2006/0219702 A1    10/2006  Lee
2011/0267324 A1*   11/2011  Stephens ............. G09G 3/3611
                                                345/207
(Continued)

FOREIGN PATENT DOCUMENTS

JP    H07-209076 A    8/1995
JP    2006-200909 A   8/2006
(Continued)

OTHER PUBLICATIONS

International Search Report for PCT/KR2016/005332 dated Sep. 21, 2016 from Korean Intellectual Property Office.

*Primary Examiner* — Jerry Wu
(74) *Attorney, Agent, or Firm* — Paratus Law Group, PLLC

(57) ABSTRACT

An electronic device including: a first functional panel having a photovoltaic cell panel defined as an upper portion thereof; a second functional panel having a display panel defined as an upper portion thereof; and a linking mechanism for connecting the first functional panel and the second functional panel to each other. A mutual-orientation between the first functional panel and the second functional panel is switched between a plurality of mutual-orientations via the linking mechanism.

5 Claims, 7 Drawing Sheets

(51) Int. Cl.
    *H02S 30/00*     (2014.01)
    *H02S 30/20*     (2014.01)
    *G04G 19/00*     (2006.01)
    *H02S 99/00*     (2014.01)
    *G04C 10/02*     (2006.01)
    *G04G 17/04*     (2006.01)

(56) References Cited

U.S. PATENT DOCUMENTS

2012/0120618 A1*   5/2012   Bohn .................... G06F 1/1618
                                                                                  361/749
2014/0168872 A1    6/2014   Heck et al.

FOREIGN PATENT DOCUMENTS

| KR | 10-2004-0006713 A | 1/2004 |
| KR | 10-2015-0016007 A | 1/2004 |
| KR | 10-2006-0099871 A | 9/2006 |
| KR | 10-2011-0029441 A | 3/2011 |
| KR | 10-2014-0078562 A | 6/2014 |

\* cited by examiner

ELECTRONIC DEVICE WITH FOLDING FUNCTION BETWEEN PHOTOVOLTAIC CELL PANEL AND DISPLAY PANEL

CROSS REFERENCE TO PRIOR APPLICATIONS

This application is a National Stage Patent Application of PCT International Patent Application No. PCT/KR2016/005332 (filed on May 19, 2016) under 35 U.S.C. § 371, which claims priority to Korean Patent Application No. 10-2015-0077751 (filed on Jun. 2, 2015), which are all hereby incorporated by reference in their entirety.

FIELD OF INVENTION

The present invention relates to an electronic device having a folding function between a photovoltaic cell panel and a display panel. More specifically, the present invention relates to an electronic device having a folding function between a photovoltaic cell panel and a display panel wherein the display panel is used in a superimposed state between the photovoltaic cell panel and the display panel, and when the power generation is required, the photovoltaic cell panel is exposed to the outside while the display panel is viewable to the user by unfolding the display panel and the photovoltaic cell panel.

RELATED ART

Recently, various portable smart electronic devices such as a tablet PC and a smart phone have been actively developed. With the development of the portable electronic devices, smart electronic devices with wearability have been actively developed.

Among these wearable smart electronic devices, there is a wrist-watch type smart electronic device. Such a wrist-watch type smart electronic device is used in conjunction with a smartphone. On the other hand, the wrist watch type smart electronic device acts as a portable PC itself.

These wrist-watch-type electronic devices are worn on the body, which requires stable and constant power supply for prolonged use. In order to solve this problem, a photovoltaic cell panel is installed to produce the power through the light energy such as solar energy.

An electronic device, in particular, a wristwatch type electronic device, equipped with the photovoltaic cell panel is disclosed in Korean Patent Application Publication No. 10-2004-0006713, and Korean Patent Application Publication No. 10-2015-0016007.

The electronic device disclosed in Korean Patent Application Publication No. 10-2004-0006713 has a configuration in which the photovoltaic cell panel is always exposed to the outside. Therefore, the photovoltaic cell panel limits the installation area of the display panel. The electronic device disclosed in Korean Patent Application Publication No. 10-2015-0016007 has a configuration in which the upper housing and the lower housing are foldable. A photovoltaic cell panel is placed on the outer face of the upper housing. Therefore, in order to generate power, the upper housing and the lower housing must be completely folded so that the upper housing overlaps with the lower housing. As a result, it is difficult to operate a keyboard, a screen, and the like while the photovoltaic generation is being performed.

SUMMARY

The present invention has been made to solve the conventional problem as described above. The invention is to provide an electronic device having a folding function between a photovoltaic cell panel and a display panel, wherein the mutual-orientation between a functional panel with a photovoltaic cell panel and a functional panel with a display panel may be freely varied such that, whether the photovoltaic cell panel is exposed to the outside or not exposed to the outside, the user may use the display panel.

In one aspect, the present disclosure provides an electronic device comprising: a first functional panel having a photovoltaic cell panel defined as an upper portion thereof; a second functional panel having a display panel defined as an upper portion thereof; and a linking mechanism for connecting the first functional panel and the second functional panel to each other, wherein a mutual-orientation between the first functional panel and the second functional panel is switched between a plurality of mutual-orientations via the linking mechanism, wherein the plurality of mutual-orientations includes: a first mutual-orientation in which the second functional panel is completely overlapped with the first functional panel so that the display panel faces upwards; a second mutual-orientation in which the first functional panel and the second functional panel are unfolded completely so that both of the display panel and the photovoltaic cell panel face upwards and the first functional panel and the second functional panel are co-planar with each other; a third mutual-orientation in which the second functional panel is pivoted relative to the first functional panel such that an angle between the display panel and the photovoltaic cell panel defines an angle greater than 90 degrees; a fourth mutual-orientation in which the second functional panel is pivoted relative to the first functional panel such that the angle between the display panel and the photovoltaic cell panel defines an angle smaller than 90 degrees; and a fifth mutual-orientation in which the second functional panel is completely overlapped with the first functional panel so that the photovoltaic cell panel faces the display panel entirely.

In one embodiment, the linking mechanism includes an elongate slot formed in the first functional panel; and a linker connecting the first functional panel and the second functional panel, wherein one end of the linker is movable along the elongate slot, and is pivotable in the elongate slot, and the other end of the linker is pivotally mounted on the second functional panel.

In one embodiment, the linker is elastic, wherein the linker allows the first functional panel and the second functional panel to pull each other such that the first functional panel and the second functional panel is brought into close contact with each other in the fourth mutual orientation or the fifth mutual orientation.

In one embodiment, the linker includes a first stick portion; a second stick portion slidable in a longitudinal direction along the first stick portion; and an elastic member connecting the first stick portion and the second stick portion.

In one embodiment, the linker includes: a plurality of stick portions that are slidably movable mutually in an length direction thereof and extend and retract; and elastic members, each connecting adjacent stick portions, wherein each elastic member provides restoring force corresponding adjacent stick portions when the corresponding adjacent stick portions are stretched together.

In one embodiment, the linker has: a first pivotal shaft movable along the elongate slot and pivotable in the elongate slot while being inserted into the elongate slot, wherein the first shaft is disposed on one end of the linker; and a second pivotal shaft position-fixed onto the second functional panel, wherein the second pivotal shaft is pivotable.

In one embodiment, the second functional panel has a pivotal shaft receiving hole for receiving the second pivotal shaft, wherein first magnets are disposed at equal intervals on an outer circumferential face of the second pivotal shaft, wherein second magnets corresponding to the first magnets are disposed on an inner circumferential face of the pivotal shaft receiving hole, wherein when the second pivotal shaft is rotated at a predetermined angle in the pivotal shaft receiving hole, the predetermined angular spacing between the first and second functional panels is maintained via magnetic force.

In one embodiment, the second functional panel has a pivotal shaft receiving hole for receiving the second pivotal shaft, wherein protrusions are formed at equal intervals on an outer circumferential face of the second pivotal shaft, wherein grooves corresponding to the protrusions are disposed in an inner circumferential face of the pivotal shaft receiving hole, wherein when the second pivotal shaft is rotated at a predetermined angle in the pivotal shaft receiving hole, the predetermined angular spacing between the first and second functional panels is maintained via engagement between the protrusions and the grooves.

In one embodiment, the device further comprises a third functional panel having a further display panel defined as an upper portion thereof; and a further linking mechanism for connecting the first functional panel or the second functional panel to the third display panel, wherein the first to third functional panels are unfolded in a L shape.

In one embodiment, the device further comprises a wrist band coupled to the first functional panel.

In accordance with the present disclosure, in the electronic device having a folding function between the photovoltaic cell panel and the display panel, the mutual-orientation between a functional panel with a photovoltaic cell panel and a functional panel with a display panel may be freely varied such that, whether the photovoltaic cell panel is exposed to the outside or not exposed to the outside, the user may use the display panel.

In particular, when the user is not using the electronic device, the first functional panel and the second functional panel may be switched to the full folded mode so that the display panel and the photovoltaic cell panel face each other. Thus, the display panel may be protected from damage such as scratches and impacts.

DETAILED DESCRIPTIONS

Figure 1:
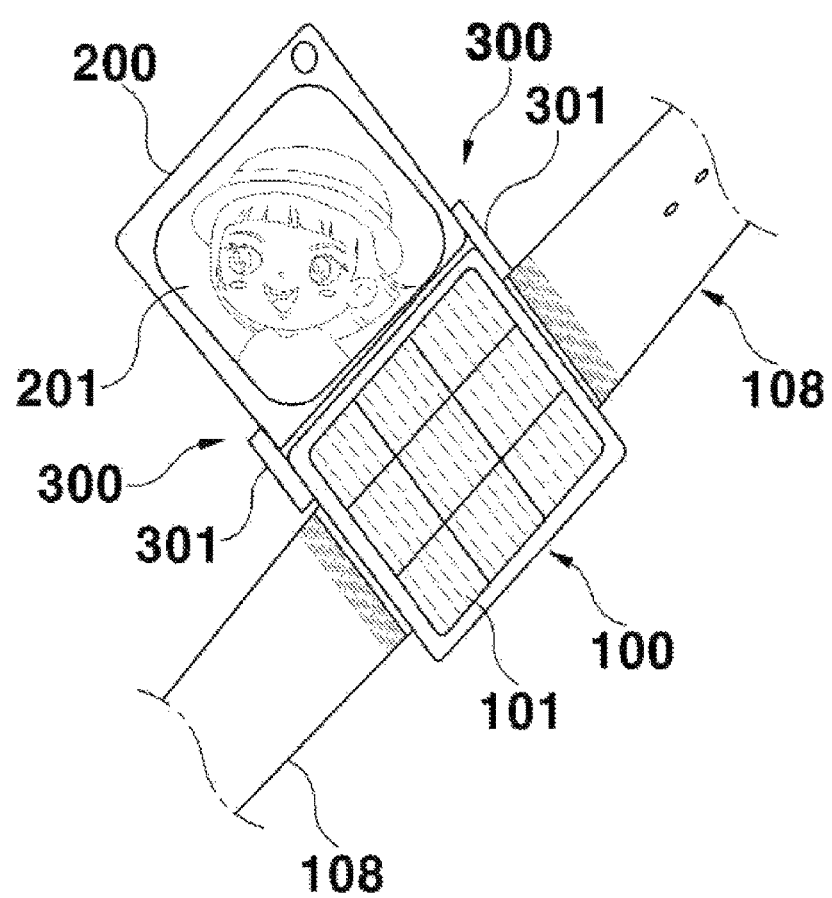
FIG. 1 is a perspective view of an example in which the electronic device with folding function between the photovoltaic cell panel and the display panel according to the first embodiment of the present invention is applied as a wristwatch type smart device.

The above and other objects, features and advantages of the present invention will become readily apparent from the following description of preferred embodiments with reference to the accompanying drawings. However, the present invention is not limited to the embodiments described herein but may be embodied in other forms. Rather, the embodiments disclosed herein are provided so that the disclosure can be thorough and complete, and will fully convey the concept of the present invention to those skilled in the art.

In the present specification, when an element is referred to as being on another element, it may mean that the former element may be directly formed on said another element or a third element may be interposed therebetween. Also, in the drawings, the thickness of the components may be exaggerated for an effective description of the present disclosure.

The embodiments described herein will be described with reference to cross-sectional views and/or plan views, which are ideal illustrations of the present invention. In the drawings, the thicknesses of the films and regions are exaggerated for an effective explanation of the technical content. Thus, the shape of the illustrations may be modified by manufacturing processes and/or tolerances. Accordingly, the embodiments of the present invention are not intended to be limited to the particular forms shown, but may include variations in form that are generated according to the fabrication process. For example, the portion shown at right angles may be rounded or may have a shape with a certain curvature. Thus, the regions illustrated in the figures have attributes, and the shapes of the regions illustrated in the figures are intended to illustrate specific forms of regions of the elements and are not intended to limit the scope of the invention. Although the terms first, second, etc. in various embodiments of the present disclosure are used to distinguish between various components, these components should not be limited by these terms. These terms have only been used to distinguish one element from another. The embodiments described and exemplified herein also include their complementary embodiments.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

Hereinafter, the present invention will be described in detail with reference to the drawings. In describing the specific embodiments below, various specific details have been set forth in order to explain the invention in greater detail and to assist in understanding it. However, it will be appreciated by those skilled in the art that the present invention may be practiced without these specific details. In some cases, it should be noted that parts of the invention that are commonly known to the skilled person to the art and are not significantly related to the invention may not be described herein in order not to unnecessarily obscure the present disclosure. In other instances, well-known process structures and/or processes have not been described in detail in order not to unnecessarily obscure the present disclosure.

Hereinafter, referring to FIGS. 1 to 6, an electronic device having a folding function between a photovoltaic cell panel and a display panel according to a first embodiment of the present invention will be described.

The electronic device according to the present invention may be a wristwatch type smart electronic device with a wrist band 108 installed thereto. Of course, the electronic device according to the present invention may be applied as other handheld smart devices other than the wristwatch devices shown in FIG. 1.

The electronic device in accordance with the present invention includes a first functional panel 100, a second functional panel 200, and a linking mechanism 300.

In the present invention, it is possible for the first functional panel 100 and the second functional panel 200 to be transformed into various forms via the linking mechanism 300. Hereinafter, configurations defining the features of the present invention are shown and described, and the configurations of remaining known configurations, for example, the main processor (CPU), the camera module, the speaker, and the like are omitted.

That is, the electronic device in accordance with the present invention may be applied as an electronic device such as a tablet PC, a smart phone, a game machine, a smart clock, etc. It goes without saying that although not shown, the components for implementing the functions embedded in the electronic device such as a tablet PC, a smart phone, a game machine, a smart dock, etc. may be embedded in the first functional panel 100 and the second functional panel 200.

Particularly, in the first functional panel 100 according to the present invention, a rechargeable battery (not shown) and a power generation control unit (not shown) are installed. The power generation control unit (not shown) converts the electricity generated by the photovoltaic cell panel 101 into an appropriate volt or current and stores the electricity in a rechargeable battery (not shown). Alternatively, the power generation control unit (not shown) may be configured to supply the power stored in the rechargeable battery (not shown) to the display panel 201, or to supply electric power to other components.

In addition, the second functional panel 200 according to the present invention includes may include various components such as a main processor, a communication module, a camera, a speaker module, and the like, for implementing various functions such as a voice call, a video call, an internet connection, a game and the like which are realized in the smart phone device.

The first functional panel 100 and the second functional panel 200 are connected by the linking mechanism 300, which enables various interconnection variations between the first functional panel 100 and the second functional panel 200. Hereinafter, various interconnection variations between the first functional panel 100 and the second functional panel 200 will be described.

The upper portion of the first functional panel 100 defines a photovoltaic cell panel 101, and the upper portion of the second functional panel 200 defines the display panel 201.

The photovoltaic cell panel 101 may be implemented as a conventional photovoltaic cell panel that produces electricity through solar energy, such as a solar panel. The photovoltaic cell panel 101 collectively means all kinds of photovoltaic cell panels capable of producing electricity using the light energy emitted from an electronic device such as an ambient lighting device as well as the solar energy.

The display panel 201 may be implemented by a known display module such as an LED, an OLED, or an LCD, or may be implemented by a display module having a touch function.

Figure 2:
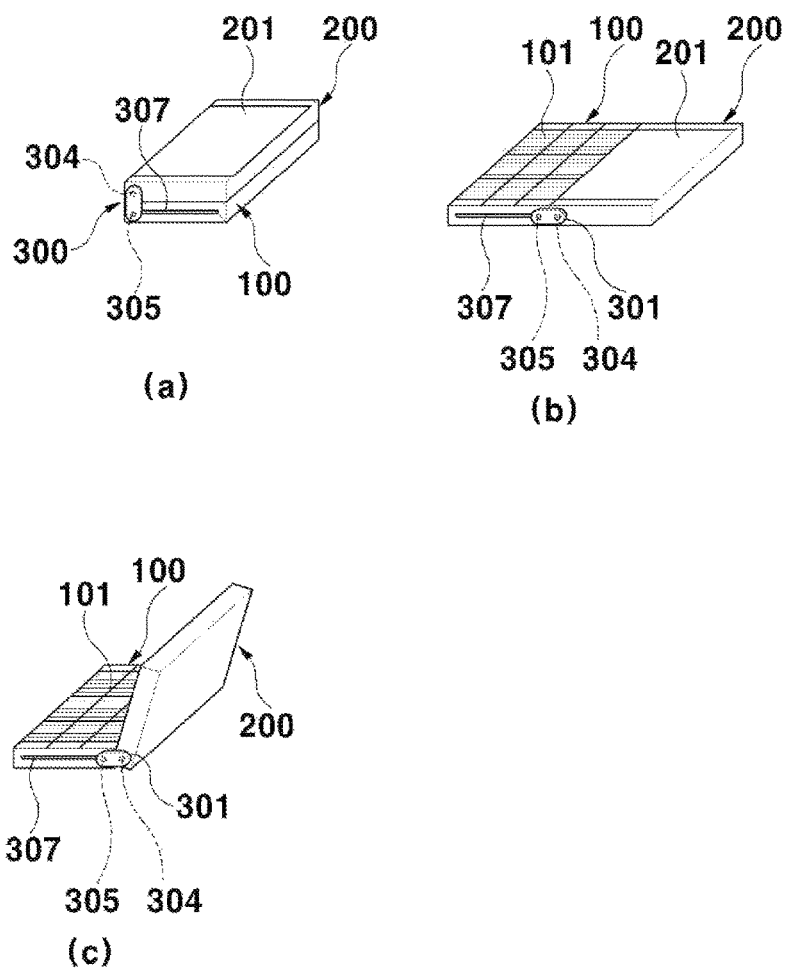
FIG. 2 shows the electronic device of the present invention with the wrist band removed in FIG. 1.
Figure 3:
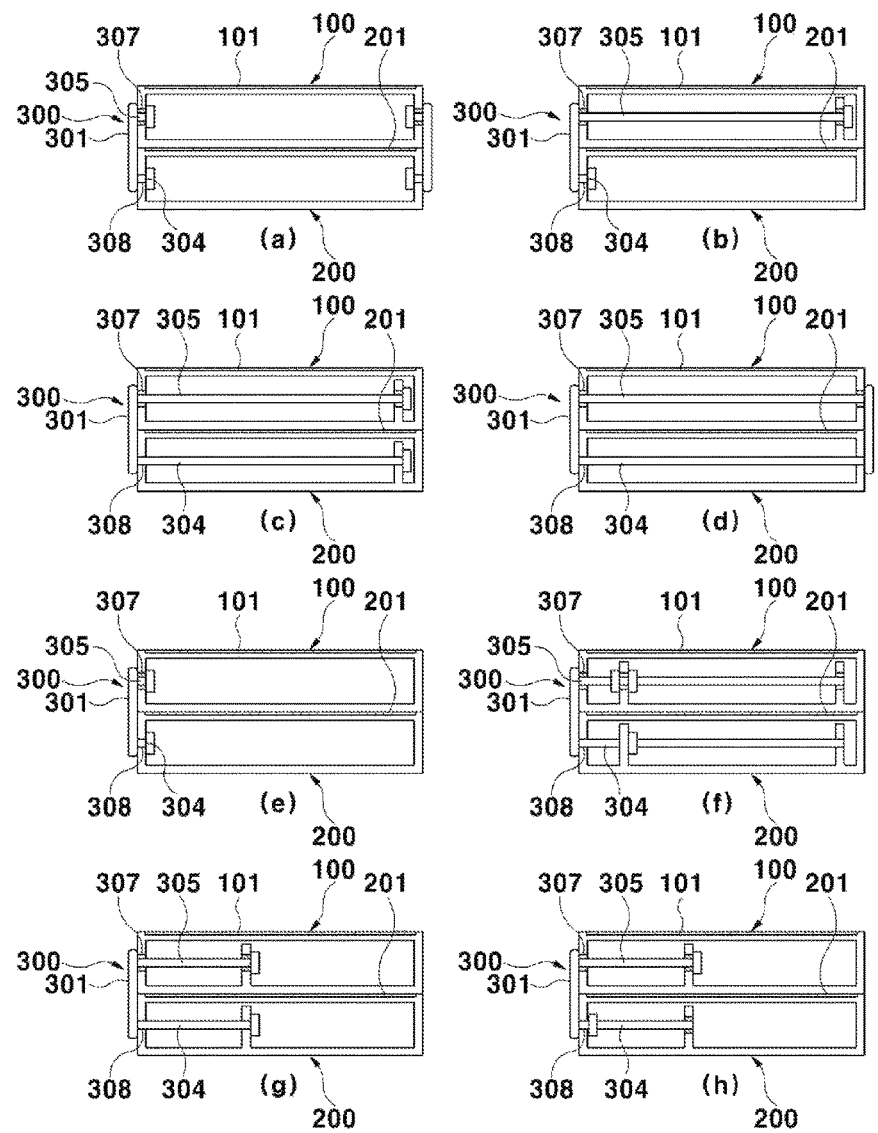
FIG. 3 shows the various configurations of the linkers in FIG. 1.
Figure 4:
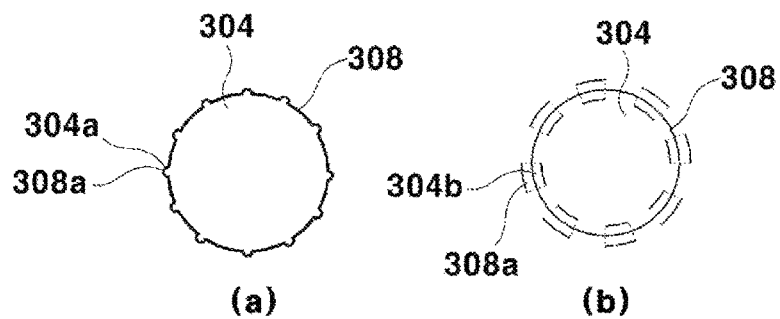
FIG. 4 shows the configuration of the fixed pivotal shaft and the pivotal shaft receiving hole of the linker in FIG. 1.

Referring to FIG. 2, the linking mechanism 300 includes an elongate slot 307 and a linker 301.

Each of elongate slots 307 is defined within each side portion of the first functional panel 100. The linker 301 connects the first functional panel 100 and the second functional panel 200. The linker 301 includes two lateral portions and two pivotal shafts extending between the two lateral portions. Hereinafter, the linker 301 generally refers to each of both lateral portions. One end of the linker is pivotally inserted into the elongate slot 307 and is configured to be slidable along the elongate slot 307. The other end of the linker 301 is pivotally installed on the second functional panel 200, more strictly, on the outer side of the longitudinal end thereof.

Specifically, a first pivotal shaft 304 and a second pivotal shaft 305 extend between both lateral portions of linkers 301. The first pivotal shaft 304 is pivotally mounted within a pivotal shaft receiving hole 308 formed in the longitudinal end of the second functional panel 200. The second pivotal shaft 305 is inserted into the elongate slot 307, and is movable along the elongate slot 307, and is pivotally installed within the elongate slot 307.

In this connection, the first pivotal shaft 304 is referred to as a fixed pivotal shaft, while the second pivotal shaft 304 is referred to as a movable pivotal shaft.

Referring to FIG. 3*a*, the linking mechanism 300 according to the present invention is installed on both sides of each of the first functional panel 100 and the second functional panel 200, respectively. In addition, the ends of the first pivotal shaft 304 and the second pivotal shaft 305 may be configured not to be separated from the elongate slot 307 and the pivotal shaft receiving hole 308, respectively. In this connection, the diameter of each of the first pivotal shaft 304 and the second pivotal shaft 305 itself may be configured in an enlarged scale, or a separate extension member may be coupled to each of the ends of each of the first pivotal shaft 304 and the second pivotal shaft 305.

Meanwhile, the linking mechanism 300 according to the present invention is not limited to the configuration shown in FIG. 3*a*. As in FIG. 3*b*, the linker 301 may be singular, and the second pivotal shaft 305 may be formed in a long extended form. A secondary elongate slot 315 may be formed in the side portion of the first functional panel 100.

Alternatively, as shown in FIG. 3*c*, the linker 301 is singular, the second pivotal shaft 305 and the first pivotal shaft 304 are both elongated, and a secondary elongate slot 315 and an auxiliary pivotal shaft receiving hole 316 may be formed.

Alternatively, as shown in FIG. 3*d*, the linker 301 may be configured as a pair, and the second pivotal shaft 305 and the first pivotal shaft 304 may be configured to extend between the pair of linkers 301.

Alternatively, as shown in FIG. 3*e*, the linking mechanism 300 may be installed only on one side portion of each of the first functional panel 100 and the second functional panel 200.

Alternatively, as shown in FIG. 3*f*, FIG. 3*g*, FIG. 3*h*, the linking mechanism 300 according to the present invention may vary in the number and positioning of the auxiliary elongate slot 315 and the auxiliary pivotal shaft receiving hole 316 compared to those in FIG. 2*c*.

Referring to FIG. 4a, protrusions 304a are formed at equal intervals on the outer circumference of the first pivotal shaft 304, while grooves 308a corresponding to the protrusions 304a are formed in the inner circumferential face of the pivotal shaft receiving hole 308. When the first pivotal shaft 304 rotates within the pivotal shaft receiving hole 308, protrusions 304a sequentially ride over the grooves 308a and settle on the next grooves 308a. As a result, a click feeling is generated. Once the user's external force is removed, the protrusions 304a are retained in the grooves 308a so that the first and second functional panels 100 and 200 may be maintained at an angle to each other, for example, as shown in FIG. 5c.

In FIG. 4a, the protrusions 304a and grooves 308a are formed on the first pivotal shaft 304 and the pivotal shaft receiving hole 308, respectively, such that the first and second functional panels 100 and 200 may be maintained at an angle to each other. The present invention is not limited thereto. In FIG. 4b, the first magnets 304b and the second magnets 308b may be installed on the first pivotal shaft 304 and the pivotal shaft receiving hole 308 respectively in a manner corresponding to each other at predetermined intervals. Before the user rotates the second functional panel 200 via the linker 301 using an external force, the first magnets 304b and the second magnets 308b are coupled with each other in such a way that they attract each other. Thus, the first pivotal shaft 304 is fixed in the pivotal shaft receiving hole 308. Thus, the first and second functional panels 100 and 200 may be maintained at an angle to each other, for example, as shown in FIG. 5c.

In the meantime, the electronic device according to the present invention may have elongate slots 307 and pivotal shaft receiving holes 308 formed in the first functional panel 100 and the second functional panel 200, respectively. However, the present invention is not limited thereto. Although not shown, a separate first member (not shown) having an elongate slot 307 formed therein, and a separate second member (not shown) having a pivotal shaft receiving hole 308 formed therein may be installed on the side face ends of the first functional panel 100 and the second functional panel 200, respectively.

According to the above-described configuration, the first functional panel 100 and the second functional panel 200 according to the present invention are connected to each other via the linking mechanism 300, and may be changed into various forms according to a user's manipulation.

Figure 5:
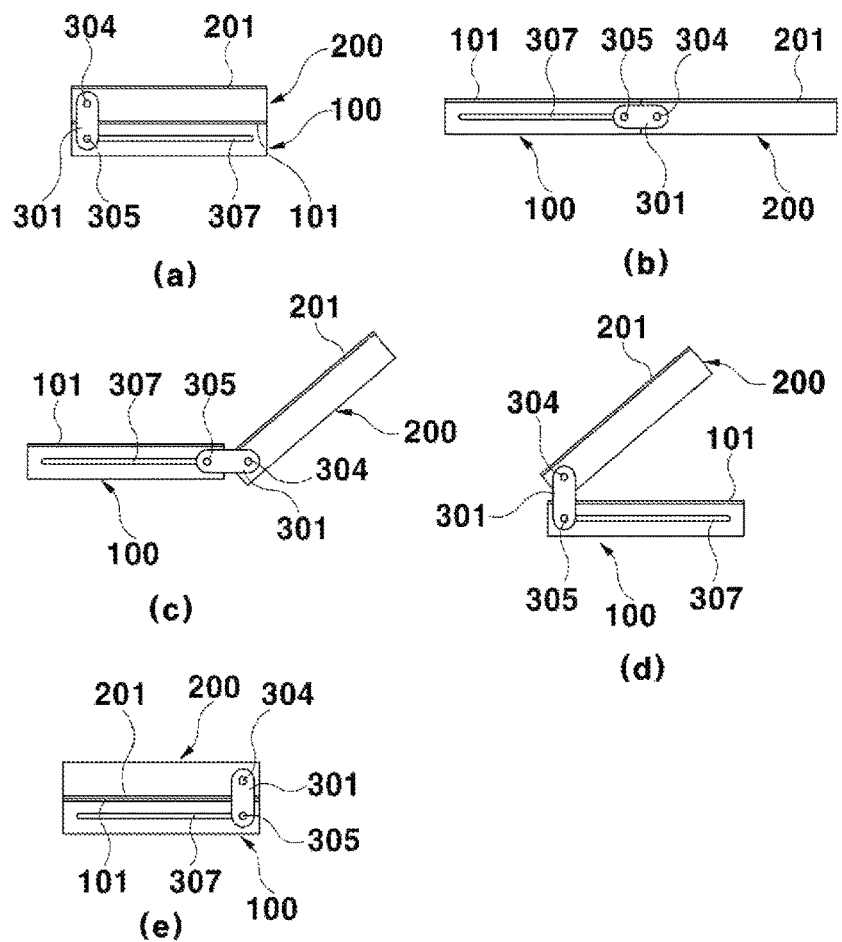
FIG. 5 shows various operations of the electronic device according to one embodiment of the present invention.
Figure 6:
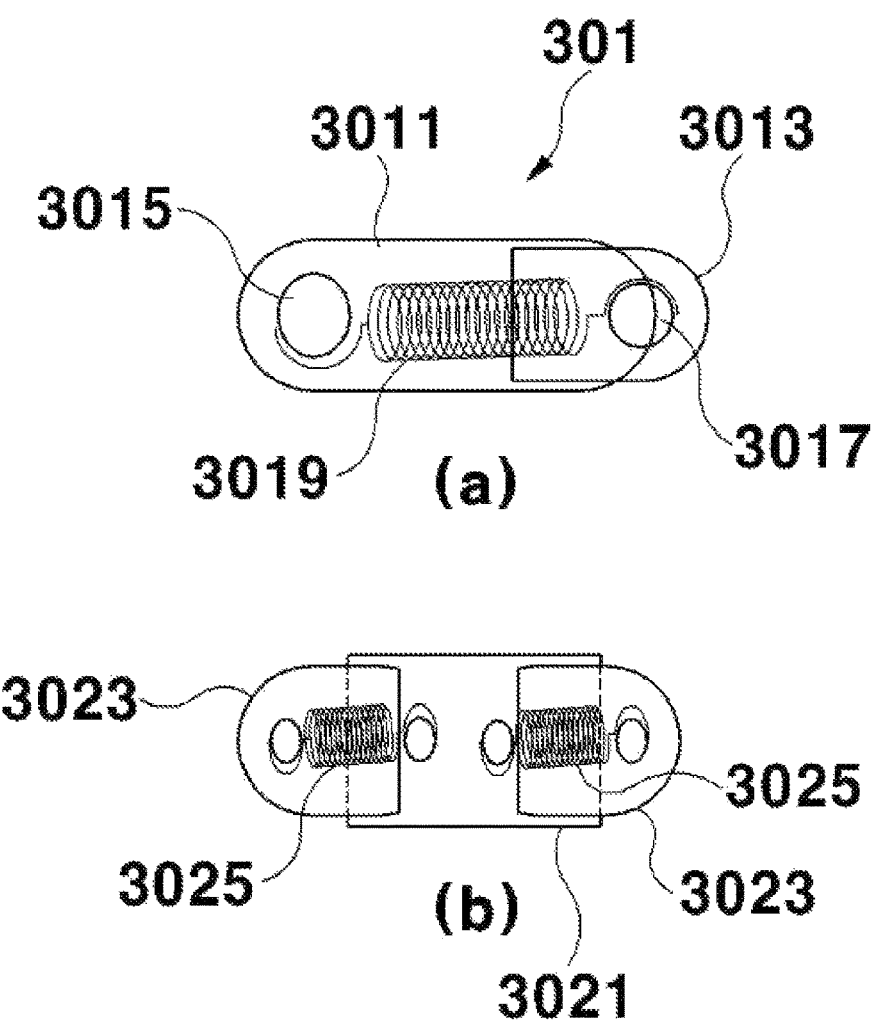
FIG. 6 shows another type linker.

Referring to FIG. 5, the achievable mutual-orientation between the first functional panel 100 and the second functional panel 200 of the electronic device according to the present invention may include first to fifth mutual-orientations.

First mutual-orientation: the second functional panel 200 is completely overlapped with the first functional panel 100 so that the display panel 201 faces upward in the normal direction (FIG. 5a).

Second mutual-orientation: The first functional panel 100 and the second functional panel 200 are unfolded so that the display panel 201 and the photovoltaic cell panel 101 faces upward in the normal direction and the first functional panel 100 and the second functional panel 200 are co-planar with each other (FIG. 5b).

Third mutual-orientation: the second functional panel 200 is pivoted relative to the first functional panel 100 such that the angle between the display panel 201 and the photovoltaic cell panel 101 defines an angle greater than 90 degrees (FIG. 5c).

Fourth mutual-orientation: the second functional panel 200 is pivoted relative to the first functional panel 100 such that the angle between the display panel 201 and the photovoltaic cell panel 101 defines an angle smaller than 90 degrees (FIG. 5d).

Fifth mutual-orientation: the second functional panel 200 is completely overlapped with the first functional panel 100 so that the photovoltaic cell panel 101 faces the display panel 201 entirely (FIG. 5e).

When the electronic device according to the present invention exists in the first mutual-orientation state, the photovoltaic cell panel 101 is in a non-power-generating state in which the panel 101 is concealed from the sun light by the second functional panel 200. In this case, the user may view the display panel 201.

When the display panel 201 of the second functional panel 200 faces upwards and the photovoltaic cell panel 101 of the first functional panel 100 faces upward, such as in the second and third mutual-orientations, the photovoltaic cell panel 101 is exposed to sunlight, thereby allowing the photovoltaic cell panel 101 to generate electricity while the user may view the display panel 201.

As in the fourth mutual-orientation mode, when the second functional panel 200 is pivoted relative to the first functional panel 100 such that the angle between the display panel 201 and the photovoltaic cell panel 101 defines an angle smaller than 90 degrees, the display panel 201 of the second functional panel 200 faces upwards and the photovoltaic cell panel 101 of the first functional panel 100 faces upward but is partially blocked by the display panel 201 from the sun light. Thus, the user may view the display panel 201. However, the photovoltaic cell panel 101 generates electricity in a smaller amount compared to the second and third mutual-orientations.

As in the fifth mutual-orientation, the second functional panel 200 is completely overlapped with the first functional panel 100 so that the photovoltaic cell panel 101 faces the display panel 201 entirely. In this mode, the photovoltaic cell panel 101 is in a non-power-generating state in which the panel 101 is concealed from the sun light by the second functional panel 200, while the user may not view the display panel 201.

This mode corresponds to a case when the user does not use an electronic device. In this mode, the display panel 201 is not exposed to the outside, thereby protecting the display panel 201 from damage such as scratches.

Thus, according to the present invention, the first functional panel 100 and the second functional panel 200 may be switched between the various mutual-orientation modes via the linking mechanism 300. This allows the user to use the electronic device via the display panel 201 whether the photovoltaic cell panel 101 is not exposed or exposed to the outside. Also, if necessary, the first functional panel 100 and the second functional panel 200 may be switched to the power generation mode to allow the electronic device to perform power generation.

In particular, when the user is not using the electronic device, the first functional panel 100 and the second functional panel 200 may be switched to the full folded mode so that the display panel 201 and the photovoltaic cell panel 101 face each other. Thus, the display panel 201 may be protected from damage such as scratches and impacts.

Referring to FIG. 6a, the linker 301 according to the present invention may have an extendable configuration. The linker 301 may be configured to provide a pulling force between the first functional panel 100 and the second functional panel 200. Specifically, the linker 301 includes a first stick portion 3011 in the form of a hollow tubular body, a second stick portion 3013 inserted in the first stick portion 3011 and slidable in the longitudinal direction therein, and an elastic member 3019. Both ends of the elastic member 3019 are coupled to a first fixed protrusion 3015 formed on the first stick portion 3011 and a second fixed protrusion 3017 formed on the second stick portion 3013, respectively. When the first stick portion 3011 and the second stick portion 3013 are stretched together, the elastic member 3019 provides an elastic force to allow the first stick portion 3011 and the second stick portion 3013 to return to its original state. In this connection, although not shown, a first pivotal shaft 304 and a second pivotal shaft 305 are formed on the respective ends of the first stick portion 3011 and the second stick portion 3013.

With the linker 301 having this configuration, when the electronic device according to the present invention is switched to the second mutual-orientation mode, the first functional panel 100 and the second functional panel 200 pull each other. As a result, the facing faces between the first functional panel 100 and the second functional panel 200 are in close contact with each other, so that the co-planar state between the first and second panels may be maintained. In this case, the photovoltaic cell panel 101 and the display panel 201 may be placed on the same plane even if the user's external force is removed.

Meanwhile, as described above, the linker 301 according to the present invention may include the two stick portions 3011 and 3013 and one elastic member 3019. However, the present invention is not limited to this. As shown in FIG. 6*b*, the linker 301 according to the present invention comprises three stick portions 3021, 2022, and 3023 in the form of tubular bodies which are mutually-slidable and longitudinally-stretchable. In addition, there are a pair of elastic members 3025 which elastically interconnect the adjacent stick portions among the three stick portions to provide an elastic force therebetween.

Besides, if the linker 301 is retractable or extendable and can be returned to its original state from an extended state, various numbers of stick portions and elastic members may be considered. In addition, in the above embodiment, the stick portions have a tubular shape so as to enable mutual stable sliding. However, the present invention is not limited to this. As long as stick portions mutually adjacent to each other are capable of sliding each other, a configuration in which a guide rail is formed on a plate may be considered.

Figure 7:
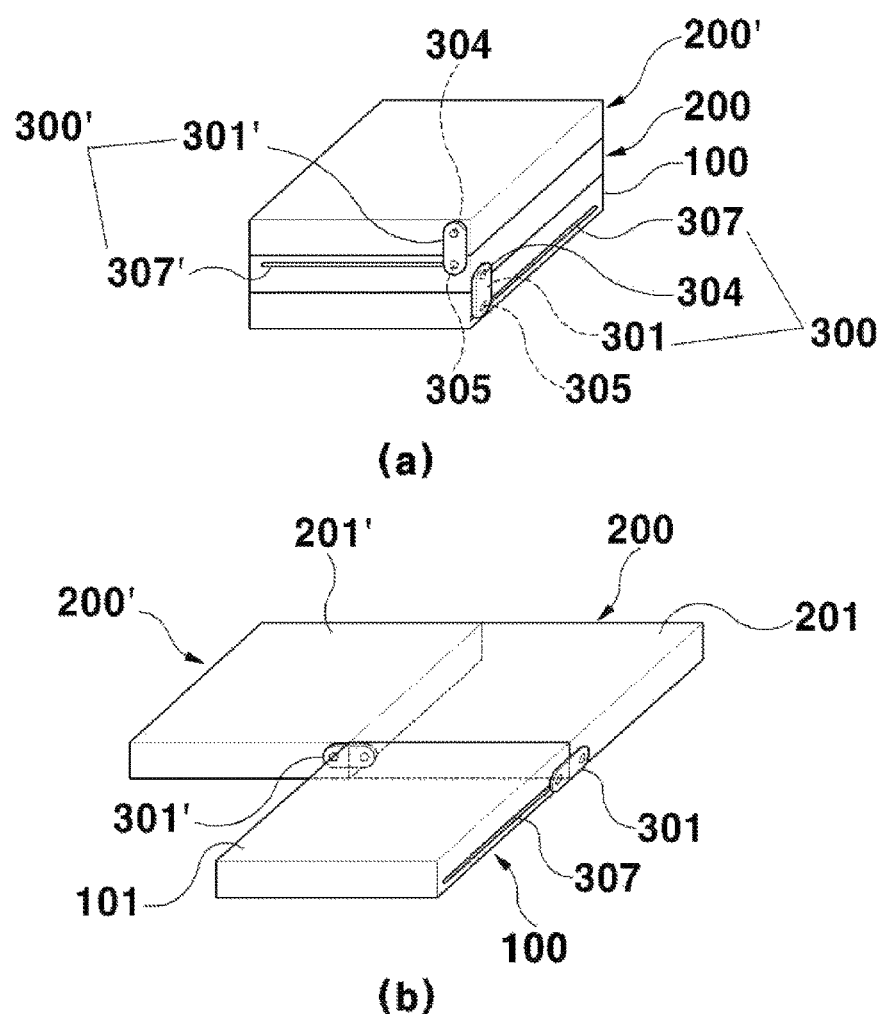
FIG. 7 is a perspective view of the electronic device with folding function between the photovoltaic cell panel and the display panel according to the second embodiment of the present invention.
Figure 8:
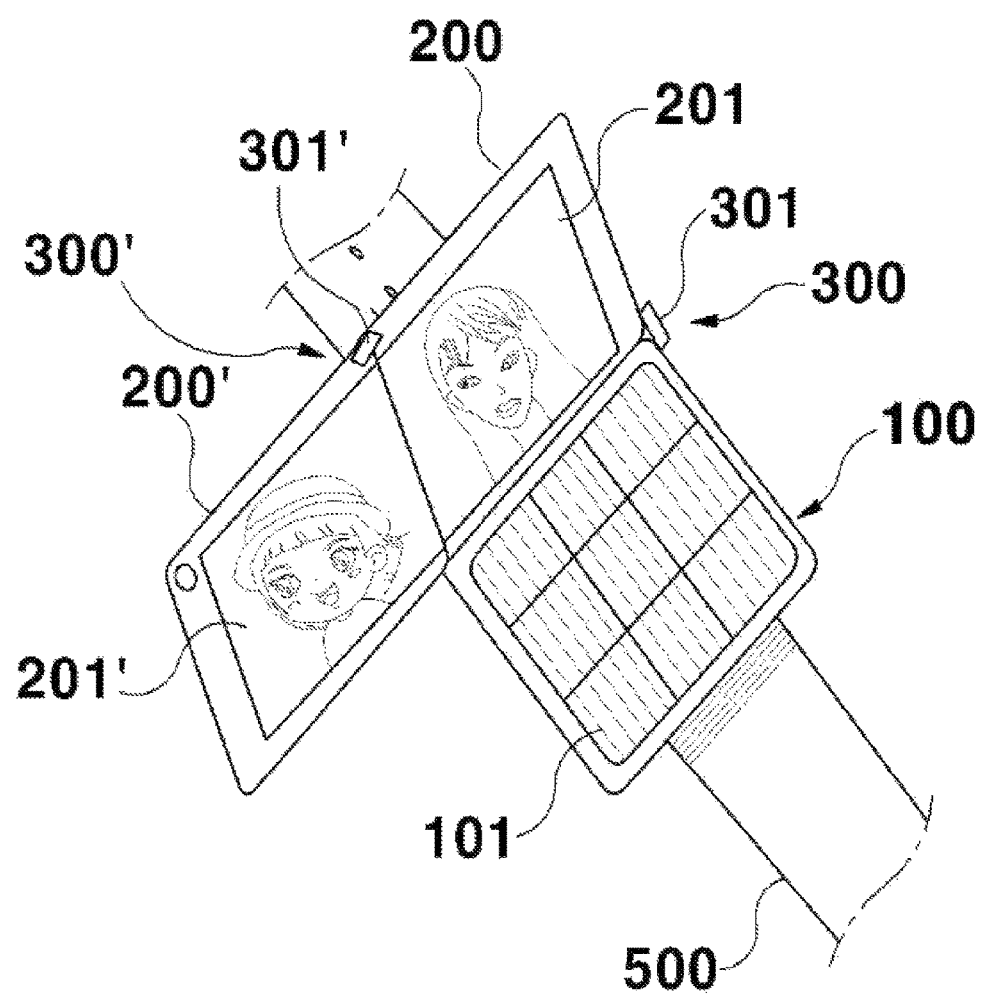
FIG. 8 is a perspective view of an example in which the electronic device with folding function between the photovoltaic cell panel and the display panel according to the second embodiment of the present invention is applied as a wristwatch type smart device.

Hereinafter, an electronic device according to a second embodiment according to the present invention will be described with reference to FIGS. 7 and 8.

An electronic device according to a second embodiment is substantially the same as the electronic device according to the first embodiment except that the electronic device according to the second embodiment additionally includes a third functional panel 200' and a second linking mechanism 300' connecting the second functional panel 200 and the third functional panel 200'.

That is, in the first embodiment, the first functional panel 100 is connected to the second functional panel 200 by the linking mechanism 300. In the second embodiment of the present invention, in the manner similar to the second functional panel 200, the third functional panel 200' having a further display panel 201' is further included. The third functional panel 200' is connected to the second functional panel 200 via the second linking mechanism 300'. In this connection, the second linking mechanism 300' has the same configuration as the linking mechanism 300.

With this configuration, the first to third functional panels 100, 200, and 200' may be stacked vertically, with the first functional panel being the bottom portion, as shown in FIG. 7*a*. If the first to third functional panels 100, 200, and 200' are completely unfolded, the first to third functional panels 100, 200, and 200' may be unfolded in an "L" shape as shown in FIG. 7*b*.

In this connection, when the first to third functional panels 100, 200, and 200' are stacked vertically, with the first functional panel being the bottom portion, as shown in FIG. 7*a*, the linking mechanism 300 and the second linking mechanism 300' are disposed on the side faces of the first pair of vertically adjacent functional panels and on the side faces of the second pair of vertically adjacent functional panels, respectively.

As described above, the first to third functional panels 100, 200, and 200' are stacked vertically as shown in FIG. 7*a*, or the first to third functional panels 100, 200, and 200' is unfolded in an "L" shape as shown in FIG. 7*b*. However, the present invention is not limited to this. According to the positioning of the second linking mechanism 300', various arrangements between the first to third functional panels 100, 200, 200' may be realized. In one example, the first to third functional panels 100, 200, 200' may be unfolded in a linear shape. In addition to the third functional panel 200', a fourth functional panel (not shown) having a still further display panel and a third linking mechanism (not shown) may be additionally included. The number of functional panels as unfolded may vary.

While the present invention has been shown and described with reference to a preferred embodiments for illustrating the principle of the present invention, the present invention is not limited to the exact configuration and effect as illustrated and described. It will be appreciated by those skilled in the art that various changes in form and details may be made thereto without departing from the spirit and scope of the appended claims. Accordingly, all such appropriate modifications and changes, and equivalents thereof, should be regarded as falling within the scope of the present invention.

INDUSTRIAL AVAILABILITY

The present invention is directed to the electronic device with folding function between the photovoltaic cell panel and the display panel. Thus, the present invention may be widely used in the field of electronic device industry.

What is claimed is:

1. An electronic device comprising:
    a first functional panel having a photovoltaic cell panel defined as an upper portion thereof;
    a second functional panel having a display panel defined as an upper portion thereof; and
    a linking mechanism for connecting the first functional panel and the second functional panel to each other,
    wherein a mutual-orientation between the first functional panel and the second functional panel is switched between a plurality of mutual-orientations via the linking mechanism,
    wherein the plurality of mutual-orientations includes:
        a first mutual-orientation in which the second functional panel with the photovoltaic cell panel facing upward is completely overlapped with the first functional panel and covers the display panel facing upwards;
        a second mutual-orientation in which the first functional panel and the second functional panel are unfolded completely so that both of the display panel and the photovoltaic cell panel face upwards and the first functional panel and the second functional panel are co-planar with each other;
a third mutual-orientation in which the second functional panel is pivoted relative to the first functional panel such that an angle between the display panel and the photovoltaic cell panel defines an angle greater than 90 degrees;
a fourth mutual-orientation in which the second functional panel is pivoted relative to the first functional panel such that the angle between the display panel and the photovoltaic cell panel defines an angle smaller than 90 degrees; and
a fifth mutual-orientation in which the second functional panel is completely overlapped with the first functional panel so that the photovoltaic cell panel and the display panel face each other,
wherein the linking mechanism includes:
an elongate slot formed at a side surface of the first functional panel along a widthwise direction of the first functional panel; and
a linker connecting the first functional panel and the second functional panel,
wherein one end of the linker is slidable along the elongate slot formed along the side surface of the first functional panel, and is pivotable in the elongate slot, and another end of the linker is pivotally mounted on the second functional panel; and a first pivotal shaft movable slidable along the elongate slot and pivotable in the elongate slot while being inserted into the elongate slot,
wherein the first pivotal shaft is disposed on one end of the linker; and a second pivotal shaft position-fixed onto the second functional panel,
wherein the second pivotal shaft is pivotable; the second functional panel has a pivotal shaft receiving hole for receiving the second pivotal shaft,
wherein protrusions are formed at equal intervals on an outer circumferential face of the second pivotal shaft,
wherein grooves corresponding to the protrusions are disposed in an inner circumferential face of the pivotal shaft receiving hole, and
wherein when the second pivotal shaft is rotated at a predetermined angle in the pivotal shaft receiving hole, the predetermined angular spacing between the first and second functional panels is maintained via engagement between the protrusions and the grooves.

2. The electronic device of claim 1, wherein the linker is elastic, wherein the linker is configured to allow the first functional panel and the second functional panel to pull each other such that the first functional panel and the second functional panel is brought into close contact with each other in the fourth mutual-orientation or the fifth mutual-orientation.

3. The electronic device of claim 2, wherein the linker includes:
a first stick portion;
a second stick portion slidable in a longitudinal direction thereof along the first stick portion; and
an elastic member connecting the first stick portion and the second stick portion.

4. The electronic device of claim 1, further comprising: a wrist band coupled to the first functional panel.

5. The electronic device of claim 1, wherein the second functional panel is slidable along a widthwise direction of the first functional panel and is pivotable on the first functional panel by the linking mechanism.

* * * * *